United States Patent [19]

Bergous

[11] Patent Number: 4,506,756
[45] Date of Patent: Mar. 26, 1985

[54] TRACTOR WITH IMPROVED FRAME CONSTRUCTION

[75] Inventor: Rauno Bergous, Jyväskylä, Finland

[73] Assignee: Valmet Oy, Finland

[21] Appl. No.: 497,728

[22] Filed: May 24, 1983

[30] Foreign Application Priority Data

May 25, 1982 [FI] Finland ............................ 821852

[51] Int. Cl.³ .............................................. B62D 21/16
[52] U.S. Cl. .................................... 180/291; 180/69.1;
180/70.1; 180/89.1; 180/900; 180/908; 280/5
A; 280/5 F; 296/204; 296/208
[58] Field of Search ............... 180/291, 292, 293, 294,
180/295, 298, 69.1, 70.1, 89.1, 900, 908; 280/5
R, 5 F, 5 A, 786; 296/202, 204, 208, 210

[56] References Cited

U.S. PATENT DOCUMENTS 1,052,867  2/1913  Wheelock ..................... 280/5 A X
1,666,208  4/1928  Huber ................................ 180/291

3,285,359 11/1966 Weeks et al. ................. 280/5 A X

Primary Examiner—Joseph F. Peters, Jr.
Assistant Examiner—Mitchell J. Hill
Attorney, Agent, or Firm—Steinberg & Raskin

[57] ABSTRACT

A farm tractor or the like including an engine situated at a forward end of the tractor substantially above the front wheel axle and a gear box situated at a rearward end of the tractor. A fuel tank is fitted between the engine and the gearbox, the fuel tank comprising an elongate box-beam shaped member constituting a load carrying part of the supporting frame assembly of the tractor and extending over a substantial part of the length thereof. The fuel tank includes a body forming wall defining a substantially single curved surface generated by a generatrix which is substantially parallel to the longitudinal direction of movement of the tractor. The body forming wall is constituted by a formed sheet of metallic material and a pair of substantially planar end members are fixed to the ends of the fuel tank body.

11 Claims, 4 Drawing Figures

TRACTOR WITH IMPROVED FRAME CONSTRUCTION

BACKGROUND OF THE INVENTION

The present invention relates in general to farm tractors or the like and, more particularly, relates to farm tractors including a supporting frame assembly on which are mounted an engine, a drive transmission and front and rear wheel axles.

In prior art constructions, the fuel tanks of tractors are generally situated at a rearward end of the tractor or at the side thereof beneath the hood of the engine. In any event, the fuel tanks of prior art tractors are usually separate from the supporting frame assembly of the tractor and not integral therewith.

The assignee of the instant application has manufactured tractors comprising a front frame or cradle constructed of welded beams or of a casting on which the tractor engine is mounted rearwardly of the front wheel axle. A gearbox having a relatively short dimension in the longitudinal direction is situated at a rearward end of this tractor and the fuel tank is situated in the space between the engine and the gearbox in a lower part of the tractor.

A common problem which exists in all conventional tractors is to provide the same with a sufficiently large capacity fuel tank. Thus, the volume of the fuel tank should preferably be sufficiently large to provide the capacity for accommodating fuel requirements for an entire working day. However, in prior art constructions, the fuel tanks of prior art tractors have not had such capacities.

Moreover, the oil sump of a tractor engine in prior art tractors has been constructed either by welding sheet metal or by a low weight casting. It is well known that such an oil sump is generally situated between the side members of an auxiliary frame of the tractor. However, the use of a separate auxiliary frame has directly resulted in an increase in the weight of the tractor and has additionally increased the complexity of the tractor construction. In such prior art tractors, the tractor engine has been situated rearwardly of the front axle which results, especially in the case of tractors having four-wheel drive, in insufficient weight being obtained over the front wheel axle and thereby rendering it necessary to provide additional weights at the front end of the tractor. The auxiliary frame associated with the oil sump has additionally rendered the repair and maintenance operations on the tractor more difficult since the auxiliary frame hinders access to the engine as well as to certain parts of the transmission and thereby makes it difficult to remove such tractor components during repair and maintenance. Moreover, especially in the case of four-wheel drive tractors and additionally with a view towards improving the quality of steering of tractors, it is also important that the tractor weight be distributed such that a relatively great weight is situated over the front wheel axle to provide good traction.

A farm tractor is disclosed in applicant's copending U.S. patent application Ser. No. 460,816 filed Jan. 25, 1983 in which the tractor engine is provided with a self-supporting oil sump which forms a structural component of the supporting frame assembly of the tractor, the wheel axle of the tractor being directly attached in connection with the oil sump. Certain aspects of the present invention are partly related to the invention described in said copending U.S. patent application

SUMMARY OF THE INVENTION

Accordingly, it is a principal object of the present invention to provide a new and improved construction for farm tractors or the like wherein the drawbacks of prior art tractors as discussed above are eliminated.

Briefly, in accordance with the present invention, this object as well as others is obtained by a combination of the following features:

(a) The engine of the tractor is situated substantially above a wheel axle of the tractor, preferably the front wheel axle, at the forward end of the tractor;

(b) The gearbox of the tractor is situated at a rearward end of the tractor;

(c) The fuel tank of the tractor is situated between the engine and the gearbox and extends over a substantial proportion of the length of the tractor; and (d) The fuel tank comprises a box-beam shaped member and constitutes a load carrying part of the supporting frame assembly of the tractor.

The combination of features of the invention are advantageously applied to a tractor whose gearbox is situated within a housing which includes only two walls and which is situated at the rearward end of the tractor so that a space is formed between the gearbox housing and the tractor engine which is situated at the forward end of the tractor above the front axle which is considerably larger than the space available in conventional tractors. Thus, it is an object of the invention to take advantage of and efficiently utilize this space as the space in which the fuel tank of the tractor is situated.

Since the fuel tank according to the invention comprises a box-beam shaped member which constitutes a load carrying part of the supporting frame assembly of the tractor, the tank must be constructed having sufficient strength and rigidity. In this connection, the wall thickness of the fuel tank is preferably in the range of between about 3 to 5 mm.

Since the fuel tank in accordance with the invention is constructed with a body forming wall defining a substantially single curved surface, as discussed below, the complexity in construction of the fuel tank is significantly reduced since the tank can preferably be constructed by forming the same of a substantially rectangular piece of sheet metal and wherein, most advantageously, only a single longitudinal welding seam is required. Thus, in the manufacture of the fuel tank for use in a tractor according to the invention, it is not necessary to perform in the costly deep drawing steps or the like.

The fuel tank of a farm tractor constructed in accordance with the invention is preferably tubular and oblong so that its height and/or width are substantially constant and so that its ends are substantially planar. The generatrix of the body forming wall of the fuel tank is substantially parallel to the longitudinal direction of movement of the tractor. In some cases, the tank may be cylindrical or have the shape of a truncated cone or the like.

Preferably, the top and bottom portions of the fuel tank are provided with longitudinally extending groove-shaped spaces. A shaft passing from the engine to the gearbox passes through one of the groove-shaped spaces while a front cardan shaft may pass from the gearbox to the front axle through the other of the groove-shaped spaces.

Moreover, in accordance with the invention, it is possible to fit a fuel tank constructed as described above in the space provided therefore and having a volume sufficient to provide a capacity for an entire working day, wherein the fuel tank has a length of between about 50 to 80% of the wheel base of the tractor, and most preferably between about 60 to 70% of the tractor wheel base.

DESCRIPTION OF THE DRAWINGS

A more complete appreciation of the present invention and many of the attendant advantages thereof will be readily understood by reference to the following detailed description when considered in connection with the accompanying drawings, to which the present invention is in no way limited, wherein.

DESCRIPTION OF THE PREFERRED EMBODIMENTS

Figure 1:
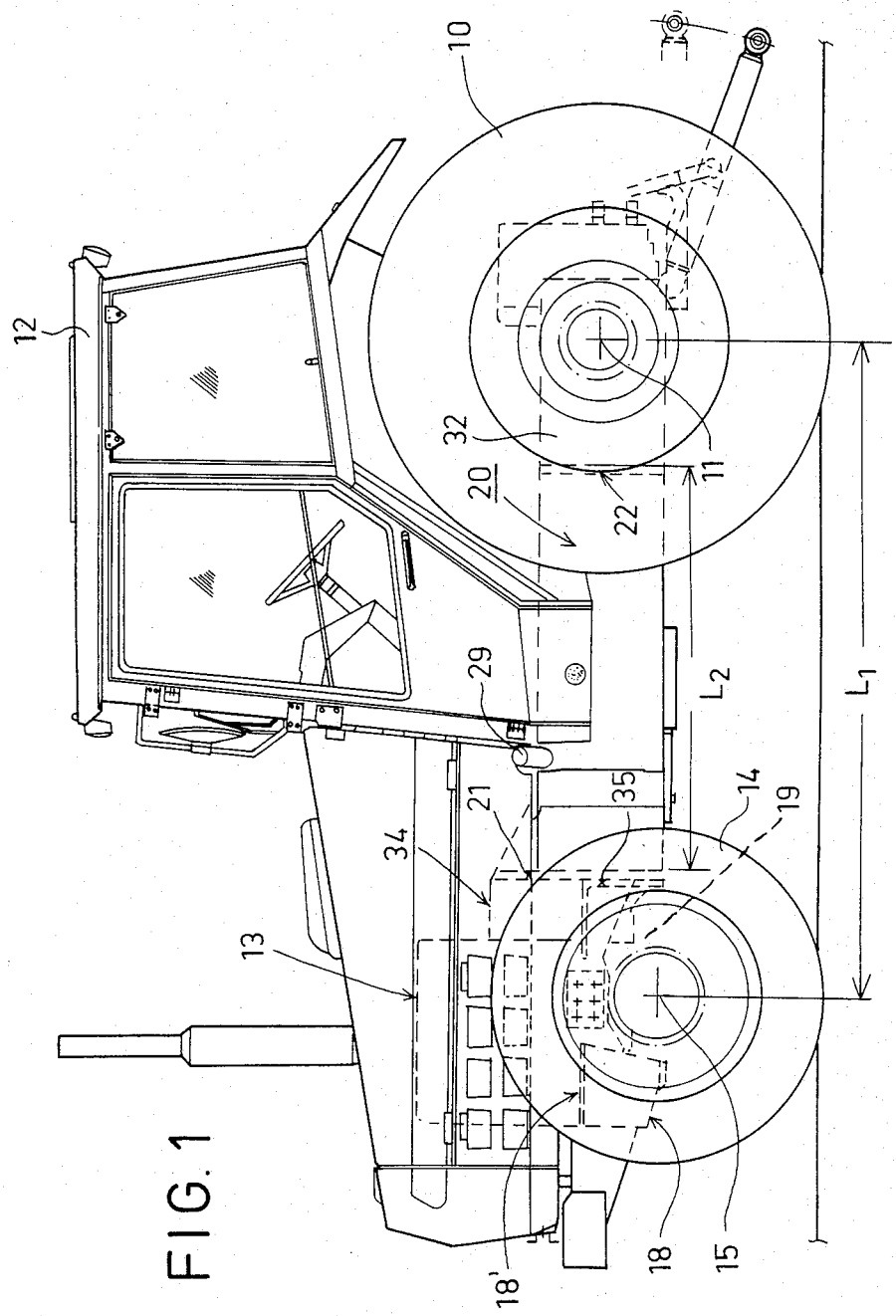
FIG. 1 is a schematic side elevation view of a farm tractor in accordance with the invention.
Figure 2:
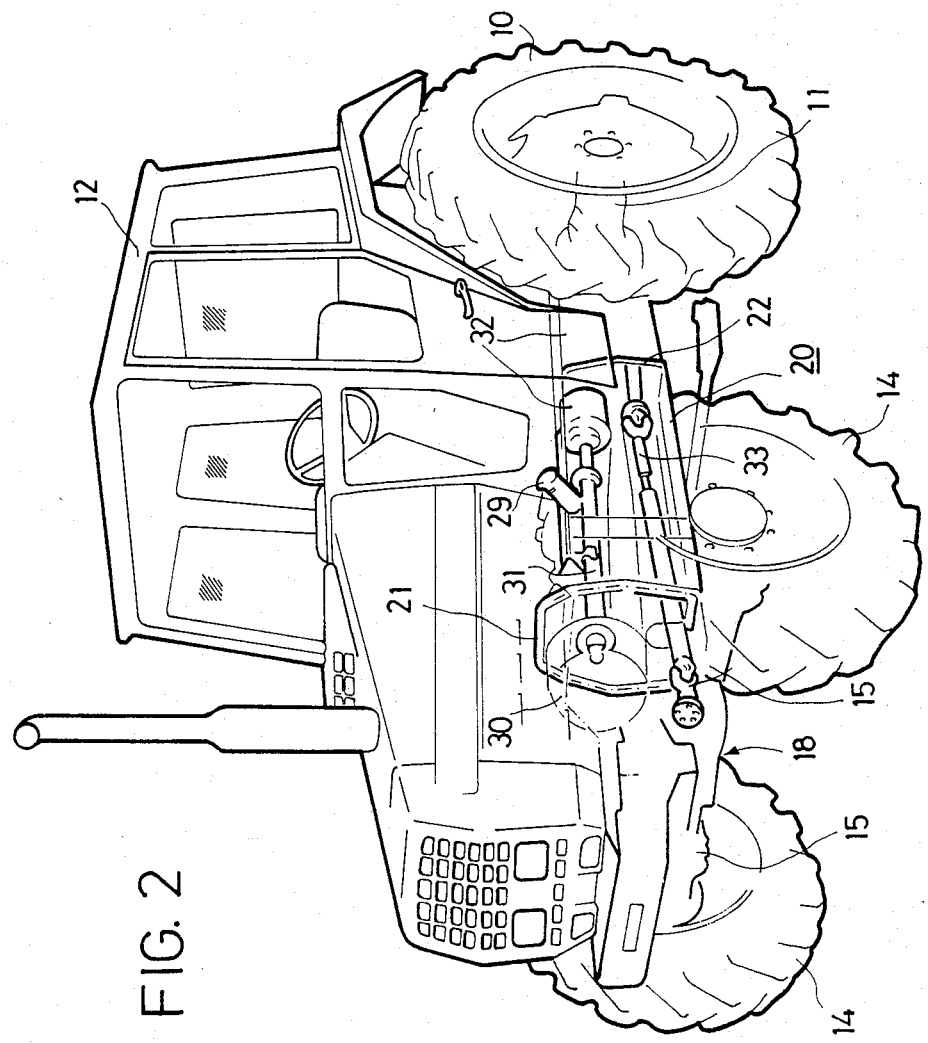
FIG. 2 is a schematic axonometric view of a farm tractor in accordance with the invention viewed obliquely from the front of the tractor, the location of the fuel tank being shown therein.

Referring now to the drawings wherein like reference characters designate identical or corresponding parts throughout the several views, and more particularly to FIGS. 1 and 2, a tractor incorporating a construction in accordance with the invention is illustrated. The tractor includes a rear axle 11 to which rear wheels 10 are mounted, the axle 11 being mounted to a rear frame of the tractor. The tractor includes a safety cab 12 and an engine 13 situated forwardly of the cab. Particularly, the engine 13 is situated considerably further towards the forward end of the tractor than has been the case in prior art construction. The tractor engine 13 comprises a self-supporting oil sump 18 which constitutes a structural component of the supporting frame assembly of the tractor. The top of the oil sump 18 is connected to the bottom part of the engine frame by means of a flange joint 18'. The front frame of the tractor is attached to a corresponding front flange of the oil sump. The oil sump 18 is connected by its horizontal flange 18' to the engine frame at a level slightly below the crank shaft. A space 19 is provided beneath the oil sump 18 at which the pivotal front axle 15 of the front wheels 14 is attached to the oil sump 18 by means of axle journals and appropriate fastening brackets (not shown). Thus, the front wheel axle 15 is supported on the load-carrying oil sump 18 of the engine 13 directly, i.e., without any intermediate auxiliary frame. Reference is made to the above-mentioned applicant's U.S. patent application Ser. No. 460,816 filed Jan. 25, 1983 with respect to the details of the construction of the oil sump 18.

Figure 3:
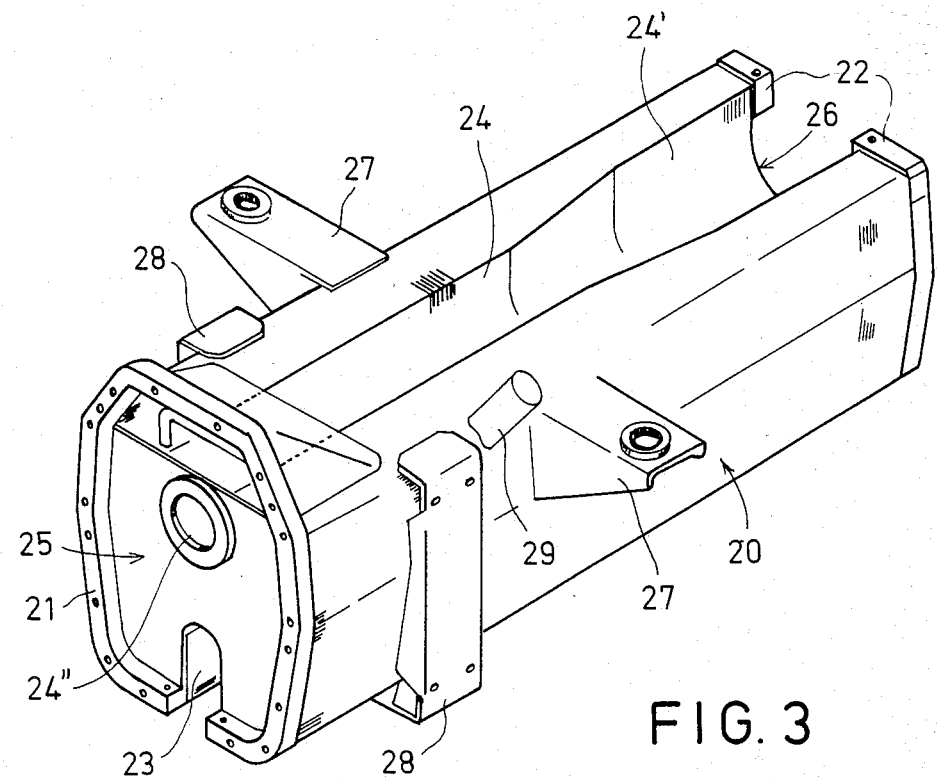
FIG. 3 is an axonometric view of a fuel tank constructed for use in connection with a tractor in accordance with the invention.

In accordance with the invention, the tractor includes a fuel tank 20 which constitutes a load carrying part of the supporting frame assembly thereof. Referring to FIG. 3 which illustrates one embodiment of a fuel tank in accordance with the invention is illustrated, the fuel tank 20 comprises a wall or mantle forming a body of the fuel tank, the body forming wall defining a substantially single curved surface and a pair of planar end members 25 and 26. It will be understood that the term single curved surface refers to a surface generated by a moving straight-line generatrix, the elements of the surface, i.e., all positions of the generatrix, being parallel or intersecting. The top portion of the tank 20 is provided with a groove-shaped space 24 having a widened portion 24' at one end. The groove-shaped space 24 terminates at an opening 24" at the other end 25 of tank 20. The bottom portion of the tank 20 is similarly provided with a second groove-shaped space 23. Both grooves 23 and 24 extend over substantially the entire length of the top and bottom portions of the fuel tank 20. Moreover, the tank 20 comprises horizontal flanges 27 and vertical flanges 28 to which the various parts of the tractor are connected as described below. The filling pipe of the fuel tank is designated 29.

A forward connecting flange 21 and a rearward connecting flange 22 are provided at the forward and rearward ends of the fuel tank 20. As seen in the figures, the fuel tank 20 is connected at its lower portion to a vertical flange 35 of the oil sump 18 and at its upper portion to the housing 34 (FIG. 1) of a clutch and flywheel 30 (FIG. 2). Fuel tank 20 is connected at its rear end through the flange 22 to the housing 32 of the gearbox and differential of the tractor.

According to a preferred embodiment of the invention, the supporting frame assembly of the tractor is constituted by the load supporting oil sump 18 of engine 13, the load carrying fuel tank 20 which constitutes an extension of the oil sump 18 and the housing 32 of the differential as well as the tubular frame members of the rear axle which are also connected to the differential housing. Thus, the fuel tank 20 constitutes an extension from the oil sump 18 while the differential housing 32 constitutes an extension of the fuel tank 20. Of these, at least the fuel tank 20 has an elongate box-beam shape. The various components of the supporting frame assembly, i.e., the oil sump 18, the fuel tank 20, and the housing 32 for the gearbox and differential, also of course function for their own particular purpose as well as functioning as part of the supporting frame assembly of the tractor. In this manner, a strong frame construction is accomplished having a low weight and which is additionally capable of accommodating a fuel tank 20 having a larger capacity than has been possible heretofore. Moreover, a relatively high proportion of the tractor weight is distributed over the front axle 15 which is especially advantageous in the case of four-wheel drive tractors.

Figure 4:
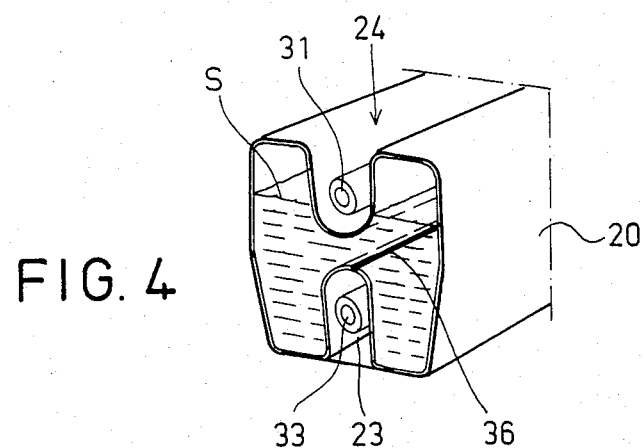
FIG. 4 is a schematic transverse cross-sectional view of a fuel tank of a tractor in accordance with the invention.

As best seen in FIGS. 2 and 4, a shaft 31 connecting the clutch 30 and gearbox 32 passes through the longitudinally extending groove 24 formed in the top wall of the fuel tank 20, the widened portion 24' of the groove 24 being provided to accommodate a part of the gearbox 32. In a similar manner, a shaft 33 interconnecting the gearbox and the front wheel axle to provide a front-wheel drive capability for the tractor passes through the longitudinally extending groove 23 formed in the bottom wall of the fuel tank 20.

As seen in FIGS. 2-4, the wall forming the body of the fuel tank 20 defines a substantially single curved surface generated by a generatrix which is substantially parallel to the longitudinal axis of the tractor.

As best seen in FIG. 4, the body of the fuel tank 20 has a substantially H-shaped transverse cross-section forming the upper and lower longitudinal grooves 24 and 23 adapted to receive the shafts 31 and 33. The fuel level in the tank 20 is designated S.

The housing 32 for the tractor gearbox is provided with two substantially vertical walls situated transversely relative to the longitudinal direction of the tractor. The gearbox shafts are journalled to these transverse walls so that the gearbox housing 32 is short relative to the fuel tank 20 in the longitudinal direction of the tractor.

Since the engine 13 of the tractor is situated as forwardly as possible and substantially above the front axle 15 according to the invention and since the gearbox of the tractor has a relatively short construction with the gearbox housing 32 being situated at a rearward end of the tractor, it is possible to obtain a relatively long space between them in the frame construction for the fuel tank 20 in accordance with the invention. Thus, the length $L_2$ of the fuel tank 20 in the longitudinal direction of the tractor is advantageously about 50 to 80% of the wheel base, designated $L_1$, of the tractor. Most preferably, the length $L_2$ of the tank 20 is between about 60 to 70% of the wheel base $L_1$.

The present invention is also advantageous from the viewpoint of the construction of the fuel tank 20. Thus, referring to FIGS. 3 and 4, the fuel tank 20 is preferably manufactured by forming a sheet of metallic material without any deep drawing steps. In this manner, the tank 20 can be manufactured so that only a single longitudinal welding seam, designated 36 in FIG. 4, is required. The planar end members 25 and 26 of the tank 20 are preferably connected to the body of mantle of the tank 20 by welding.

The longitudinally extending grooves 23 and 24 for the shafts 33 and 31 are also advantageous in that their provision serves to increase the bending and torsion strength of the tank 20 as well as reducing the vibration of the tank relative to conventional circular or rectangular tanks.

According to the invention, the fuel tank 20 forms a relatively long load carrying component having a box-beam shape and constitutes a part of the supporting frame assembly of the tractor. By this construction, optimal strength and rigidity are obtained and, at the same time, the volume of the fuel tank can be made sufficiently large to enable the tractor to operate for an entire working day without refueling.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. In a farm tractor or the like including a supporting frame assembly on which are mounted an engine, a drive transmission including a gearbox, and front and rear wheel axles, said tractor further including a fuel tank, the improvement comprising, in combination:
    said engine is situated at a forward end of the tractor substantially above the front wheel axle;
    said transmission gearbox is situated at a rearward end of the tractor;
    said fuel tank is situated between said engine and said transmission gearbox, and wherein said fuel tank comprises an elongate box-beam shaped member constituting a load carrying part of said supporting frame assembly of the tractor extending over a substantial part of the length of the tractor.

2. The combination of claim 1 wherein said fuel tank includes a wall forming a body of said fuel tank, said body forming wall defining a substantially single curved surface generated by a generatrix which is substantially parallel to the longitudinal axis of the tractor.

3. The combination of claim 2 wherein said body forming wall is constituted by a formed sheet of metallic material, said fuel tank further including a pair of end members fixed to respective ends of said fuel tank body.

4. The combination of claim 3 wherein said fuel tank end members are substantially planar.

5. The combination of claim 2 wherein said fuel tank body has a substantially H-shaped transverse cross-section such that upper and lower longitudinal grooves extend over substantially the entire length of top and bottom portions of said fuel tank.

6. The combination of claim 1 wherein the tractor includes a clutch and flywheel situated in a housing associated with said engine, an oil sump constituting a part of said engine and a housing for said transmission gearbox, and wherein said fuel tank includes a front flange fixed to said clutch and flywheel housing and to said oil sump, and a rear flange fixed to said gearbox housing.

7. The combination of claim 1 wherein said tractor engine is provided with a self-supporting oil sump, said oil sump constituting a part of said supporting frame assembly of the tractor, and wherein said front wheel axle is directly mounted to said oil sump.

8. The combination of claim 1 wherein said tractor engine is provided with an oil sump, said transmission gearbox is situated in a housing and wherein said tractor supporting frame assembly substantially comprises said engine oil sump, said fuel tank and said gearbox housing as components thereof, said frame assembly components being fixed to each other with said fuel tank being situated between said oil sump and said gearbox housing.

9. The combination of claim 1 wherein said front and rear wheel axles define a wheel base length between them, and wherein the length of said fuel tank is in the range of between about 50-80% of said wheel base length.

10. The combination of claim 9 wherein the length of said fuel tank is in the range of between about 60-70% of said wheel base length.

11. The combination of claim 1 wherein said transmission gearbox is situated in a housing, said gearbox housing including only two substantially vertical walls and being short relative to said fuel tank in the direction of longitudinal axis of the tractor.

* * * * *